No. 761,730. PATENTED JUNE 7, 1904.
Z. R. TUCKER.
PUMP AND WATER CONNECTION.
APPLICATION FILED JAN. 27, 1902.
NO MODEL.
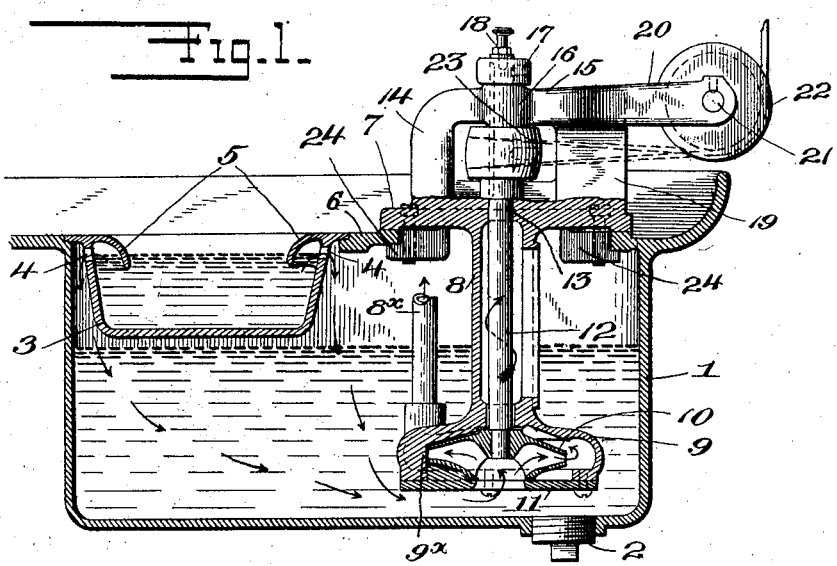
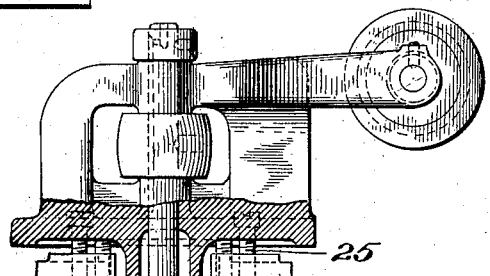
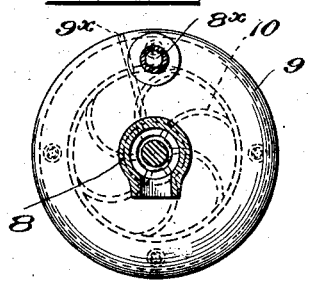
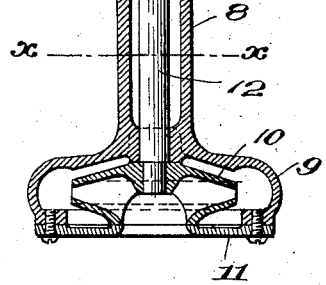
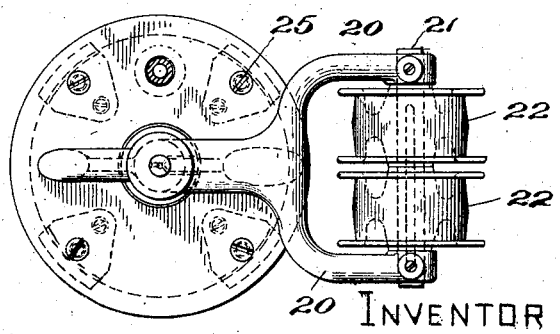
WITNESSES:
J. B. McGirr.
H. M. Seamans.
INVENTOR
Zechariah R. Tucker
by
Duell Megrath & Warfield
Attorneys.

No. 761,730. Patented June 7, 1904.

UNITED STATES PATENT OFFICE.

ZECHARIAH RHODES TUCKER, OF PROVIDENCE, RHODE ISLAND, ASSIGNOR, BY MESNE ASSIGNMENTS, TO IROQUOIS MACHINE COMPANY, OF BEDFORD, NEW YORK, A CORPORATION OF NEW YORK.

PUMP AND WATER CONNECTION.

SPECIFICATION forming part of Letters Patent No. 761,730, dated June 7, 1904.

Application filed January 27, 1902. Serial No. 91,313. (No model.)

*To all whom it may concern:*

Be it known that I, ZECHARIAH RHODES TUCKER, residing at Providence, in the county of Providence and State of Rhode Island, have invented certain new and useful Improvements in Pumps and Water Connections, of which the following is a full, clear, and exact description, such as will enable others skilled in the art to which it appertains to make and use the same.

This invention relates to a pump and water connections therefor; and its object is to provide an improved pump, tank, and connections therefor adapted for a variety of uses, but especially designed for use in supplying water to the wheel of a grinding-machine.

The invention consists in the construction and combination of parts, which will be hereinafter described and the novel features thereof specifically pointed out in the claims at the end of this specification.

In the accompanying drawings, Figure 1 is a vertical sectional view through the tank and pump. Fig. 2 is a detail view, partly in section and partly in elevation, of the pump-casting, pump, shaft, and driving-pulleys. Fig. 3 is a sectional view on line $x$ $x$ of Fig. 2 looking downwardly. Fig. 4 is a top plan view of the parts shown in Fig. 2.

Similar reference characters refer to similar parts throughout the several views.

A main tank 1 may be incorporated into the frame of the machine with which the pump is adapted to be used or may be supported in any desired position with relation thereto. It is provided with a plug 2 in its lower side, which may be removed when it is desired to clean the tank. A supplementary tank or precipitation-pan 3, through which the water flows into the main tank, is seated, by means of side flanges, in the cover of the tank and is provided with orifices 4 in the upper part of its sides, flanges 5 projecting inwardly and downwardly to a point below the orifices 4, thereby forming traps through which the water passes to the tank below. This prevents any sediment or dirt floating on top of the water from passing through into the pump, while heavier articles, such as iron and emery, settle at the bottom. As the pan is not fastened in any way, it can be lifted out and its contents emptied as often as desired. The opening in the top of the tank, through which the pump and its contents are inserted, is closed by a plate or cap 7, which carries connected with it, preferably integrally, as shown, a pump-runner 8, having at its bottom a pump-chamber 9, from which leads the delivery-pipe $8^\times$. A partition $9^\times$ (indicated by dotted lines in Fig. 1) partially fills the pump-chamber 9 at a point to one side of the mouth of the delivery-pipe, forming at this point a close fit about the bucket-casing 10, which is divided by curved partitions into suitable chambers or buckets, as indicated by the dotted lines in Fig. 3. The lower side of the pump-casing is closed by a cap 11, suitably attached thereto, an opening left in the middle thereof, which provides passage for the water from the tank into the buckets, whence in the revolution thereof it is forced through the delivery-pipe, as will be readily understood. The bucket-casing 10 is supported on the lower end of the vertical shaft 12, which passes through the pump-casing 8 and clears the inner side of such casing at all points up to the point where a bearing is provided at 13 in the cap 7. Uprising from one side of the cap 7 is a support 14, which is bent in a horizontal direction at 15 and provides a second bearing at 16 for the shaft 12 passing therethrough. The downward thrust of shaft 12 is taken by a collar 17, suitably secured to the upper end of said shaft and having appliances 18 for oiling. A second strengthening-support 19 may be provided, if desired. The outer end of arm 15 is forked to provide the yoke 20, in the ends of which is supported the pin 21, on which revolves the two idler-pulleys 22, on which a belt suitably driven from a counter-shaft or otherwise, as desired, is guided, said belt passing thence around the driving-pulley 23, secured to the shaft 12 at a point between the bearings 13 and 16. The pulley is secured to the shaft by a set-screw, and in assembling the shaft may be inserted through the casing and the pulley thereupon secured at its upper end, as indicated. Cap 7 may be clamped in position on the cover of the tank by means of the clamps 24, which are screwed up by the screws 25, having their heads on the outside of the casing. This construction enables the pump-frame to be set in any desired position to accommodate the position of the pulley on the counter-shaft for driving the same. If desired at any time, the clamps holding the pump may be loosened and the whole pump, pipe, and connections lifted bodily out without any joint or pipe connections being broken, as they are all attached to the pump proper. The advantages of the construction in which the vertical pump-shaft is supported in bearings outside of the tank and in which no stuffing-box is required are obvious.

It is not necessary to illustrate further the delivery-pipe connections. Such pipe may be connected in any desired way to the water-supply pipe in connection with the grinding-wheel of a grinding-machine or may be connected with a pipe leading to any desired point at which a supply of water is desired.

The operation will be sufficiently clear from the description already given.

Having described my invention, what I claim as new, and desire to secure by Letters Patent, is—

1. In a device of the class described, a tank, a plate or cap detachably and adjustably secured in the cover thereof, a pump-casing connected with said cap and projecting within said tank, a vertical shaft therefor, bearings on said cap for said shaft and a driving-pulley on said shaft, between said bearings, substantially as described and for the purposes set forth.

2. In a device of the class described, a tank, a cap or plate adapted to be adjustably secured in the cover of said tank, and a pump casing and gearing supported by said cap, independently of said tank, the securing means comprising clamps 24 and means for actuating said clamps operated from the upper side of the cap substantially as set forth.

3. In a device of the class described, a cap adapted to be adjustably secured to a suitable tank, an arm carried by said cap, providing a vertical bearing for the pump-shaft, and journals for the spindle of an idler-pulley, a second bearing in said cap in line with said first-mentioned bearing, a vertical shaft supported in said bearings and extending below said cap, a pump-runner connected to said shaft and a driving-pulley on said shaft between said bearings.

4. In combination, a cap or plate 7, adapted to be detachably secured in position with relation to a suitable tank, a pump-casing in connection therewith, a vertical shaft 12 adapted to support a pump within said casing, an upright arm 14 supported on said cap and bent at right angles to form the arm 15, bearings for said vertical shaft provided in connection with said arm 15, and in connection with said cap, and a driving-pulley suitably mounted on said shaft between said bearing-points, substantially as and for the purposes set forth.

5. The combination, with a tank, trough or the like having in its top an opening adapted to permit the insertion and removal of a rotary pump, and a cover-plate for said opening, of a downwardly-depending hollow sleeve carried by said cover-plate, a rotary pump suspended therefrom having a driving-shaft located within said sleeve, and a bearing-bracket for said shaft likewise carried by said cover-plate.

6. The combination, with a tank, trough or the like having in its top an opening adapted to permit the insertion and removal of a rotary pump, and a cover-plate for said opening, of a downwardly-depending hollow sleeve carried by said cover-plate, a rotary pump suspended therefrom having a driving-shaft located within said sleeve, a bearing-bracket for said shaft likewise carried by said cover-plate, said sleeve and bracket having lower and upper bearings, respectively, for the said driving-shaft.

In testimony whereof I affix my signature in the presence of two witnesses.

ZECHARIAH RHODES TUCKER.

Witnesses:
HENRY C. BABCOCK,
ALICE H. ABORN.